(12) United States Patent
Malcolm

(10) Patent No.: US 11,007,658 B2
(45) Date of Patent: May 18, 2021

(54) FIBER-RESIN COMPOSITE BOLT CUTTER TOOL

(71) Applicant: Roger J. Malcolm, San Clemente, CA (US)

(72) Inventor: Roger J. Malcolm, San Clemente, CA (US)

( * ) Notice: Subject to any disclaimer, the term of this patent is extended or adjusted under 35 U.S.C. 154(b) by 0 days.

(21) Appl. No.: 16/405,879

(22) Filed: May 7, 2019

(65) Prior Publication Data

US 2019/0375120 A1  Dec. 12, 2019

Related U.S. Application Data

(60) Continuation-in-part of application No. 29/562,350, filed on Apr. 25, 2016, now Pat. No. Des. 847,598, which is a division of application No. 29/450,315, filed on Mar. 15, 2013, now Pat. No. Des. 754,500, which is a continuation-in-part of application No. 29/411,262, filed on Jan. 18, 2012, now Pat. No. Des. 684,831, which is a division of application No. 29/386,284, filed on Feb. 27, 2011, now Pat. No. Des. 668,126, which is a division of application No. 29/336,879, filed on May 11, 2009, now Pat. No. Des. 633,764.

(51) Int. Cl.
*B26B 17/02* (2006.01)
*B23D 29/02* (2006.01)

(52) U.S. Cl.
CPC .............. *B26B 17/02* (2013.01); *B23D 29/02* (2013.01)

(58) Field of Classification Search
CPC ................................ B26B 17/02; B23D 29/02

USPC ........................................................... 30/375
See application file for complete search history.

(56) References Cited

U.S. PATENT DOCUMENTS

| | | | | |
|---|---|---|---|---|
| D211,262 S | * | 6/1968 | Theobald et al. | ................ D8/90 |
| 3,575,037 A | * | 4/1971 | Porter | ..................... B26B 17/02 |
| | | | | 72/409.11 |
| 4,198,749 A | * | 4/1980 | Nordin | ..................... B25B 7/123 |
| | | | | 30/122 |
| 4,287,623 A | * | 9/1981 | Tarran | ..................... B23D 29/02 |
| | | | | 7/158 |
| 4,805,819 A | * | 2/1989 | Collins | .................. B26B 29/025 |
| | | | | 224/232 |
| 5,081,769 A | * | 1/1992 | Juros | ....................... B23D 29/02 |
| | | | | 30/234 |
| 5,546,662 A | * | 8/1996 | Seber | ....................... B26B 1/044 |
| | | | | 30/160 |
| 5,560,107 A | * | 10/1996 | Herbert | ................... B26B 13/26 |
| | | | | 30/254 |
| 6,742,264 B1 | * | 6/2004 | Urion | ..................... B23D 51/10 |
| | | | | 30/166.3 |

(Continued)

*Primary Examiner* — Omar Flores Sanchez
(74) *Attorney, Agent, or Firm* — Charmasson, Buchaca & Leach, LLP

(57) ABSTRACT

A light-weight bolt cutter tool includes a pair of opposing pivotally mounted jaws, each made from a fiber-reinforced composite body jacketed by a blade having a hardened metal outer surface oriented to forcibly engage the other one of said jaws. The bolt cutter tool can be actuated by a pair of elongated, hollow fiber resin composite handles. Each handle can include an elastomeric damping plug to prevent debris entering the hollow handle and reduce material fatigue. A quick-deployment, quiver-style backpack can conveniently carry the colt cutters when not in use.

8 Claims, 6 Drawing Sheets

(56) References Cited

U.S. PATENT DOCUMENTS

| | | | | |
|---|---|---|---|---|
| 7,175,023 | B2* | 2/2007 | Martin | B24D 15/06 |
| | | | | 206/349 |
| 7,191,525 | B2* | 3/2007 | Brailovskiy | B25B 7/126 |
| | | | | 30/180 |
| 7,621,052 | B1* | 11/2009 | Kerr | B26B 17/02 |
| | | | | 30/188 |
| D684,831 | S* | 6/2013 | Malcolm | D8/20 |
| D754,500 | S* | 4/2016 | Malcolm | D8/20 |
| 10,136,583 | B2* | 11/2018 | Dechant | A01G 3/021 |
| D847,598 | S* | 5/2019 | Malcolm | D8/52 |
| 2004/0060177 | A1* | 4/2004 | Erbrick | B26B 17/00 |
| | | | | 30/191 |
| 2005/0076513 | A1* | 4/2005 | Brailovskiy | B23D 29/002 |
| | | | | 30/250 |
| 2010/0199503 | A1* | 8/2010 | Lorenson | H02G 1/005 |
| | | | | 30/251 |
| 2011/0289784 | A1* | 12/2011 | Jones | B26B 17/006 |
| | | | | 30/175 |
| 2012/0198704 | A1* | 8/2012 | Cosier | B26B 17/02 |
| | | | | 30/186 |
| 2015/0151368 | A1* | 6/2015 | Nissani | B23D 29/00 |
| | | | | 83/39 |
| 2016/0158946 | A1* | 6/2016 | Matsushita | B25G 1/06 |
| | | | | 30/193 |
| 2018/0298646 | A1* | 10/2018 | Didion | B65D 75/002 |
| 2019/0202036 | A1* | 7/2019 | Shen | B26B 17/02 |
| 2019/0255630 | A1* | 8/2019 | Rodriquez | B26B 17/00 |
| 2019/0291287 | A1* | 9/2019 | Feuerstein | B25G 1/066 |
| 2020/0061747 | A1* | 2/2020 | Wang | C21D 9/24 |
| 2020/0070239 | A1* | 3/2020 | Bowman, II | B23D 29/002 |

* cited by examiner

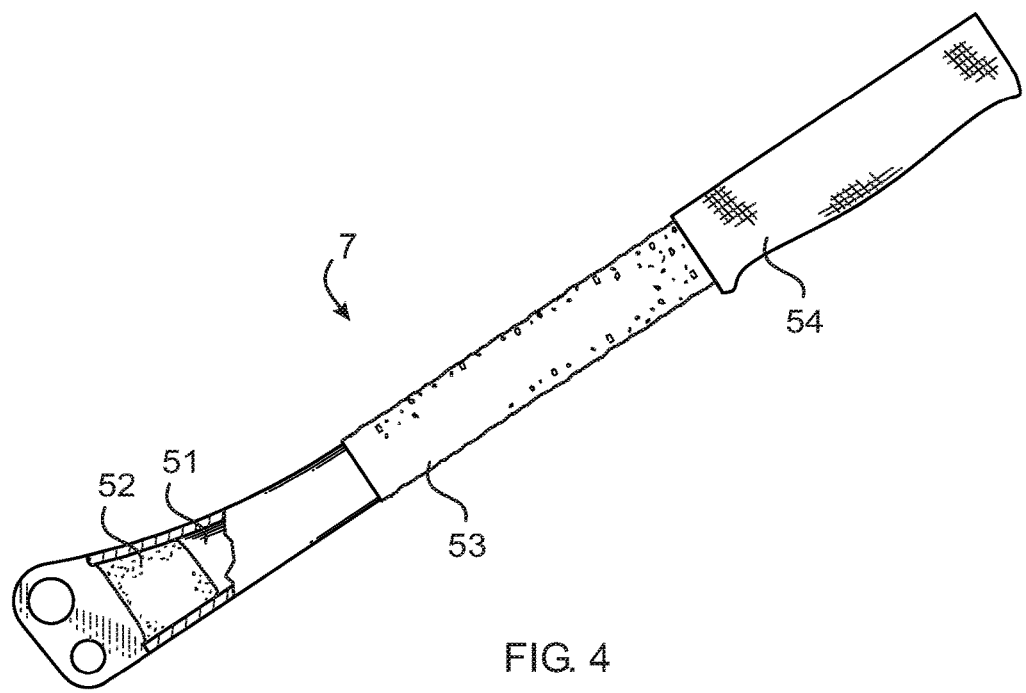
FIG. 4
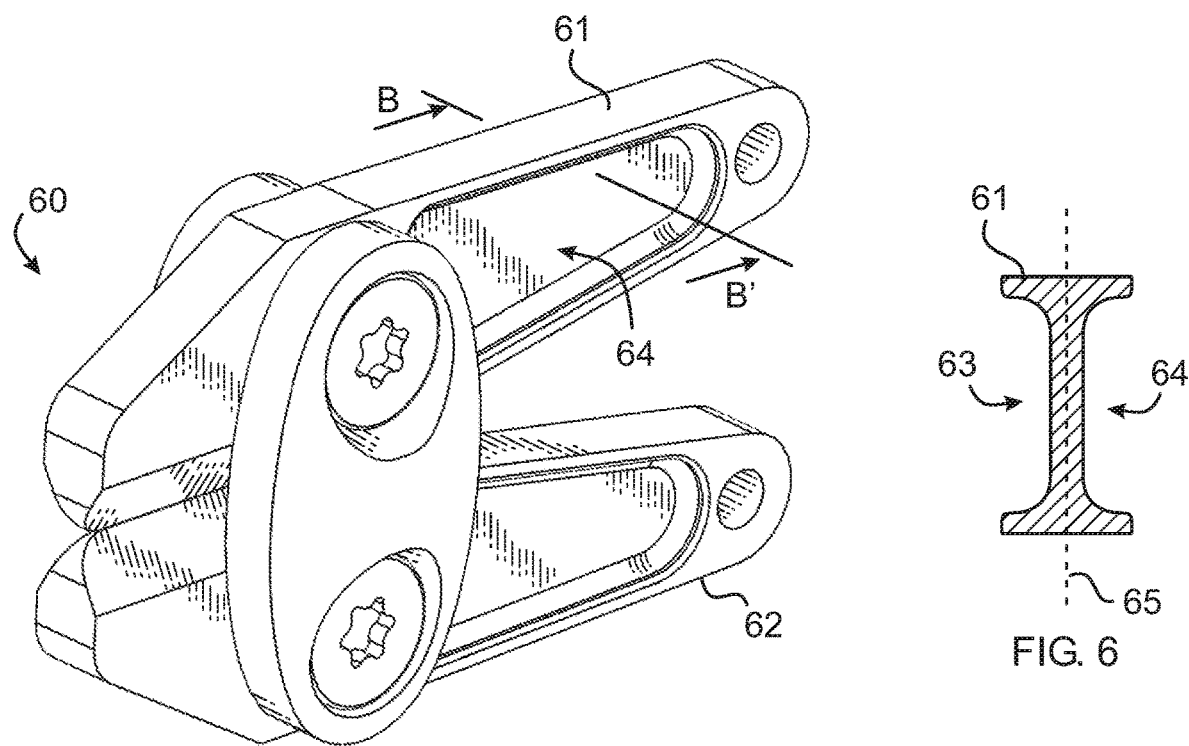
FIG. 5
FIG. 6

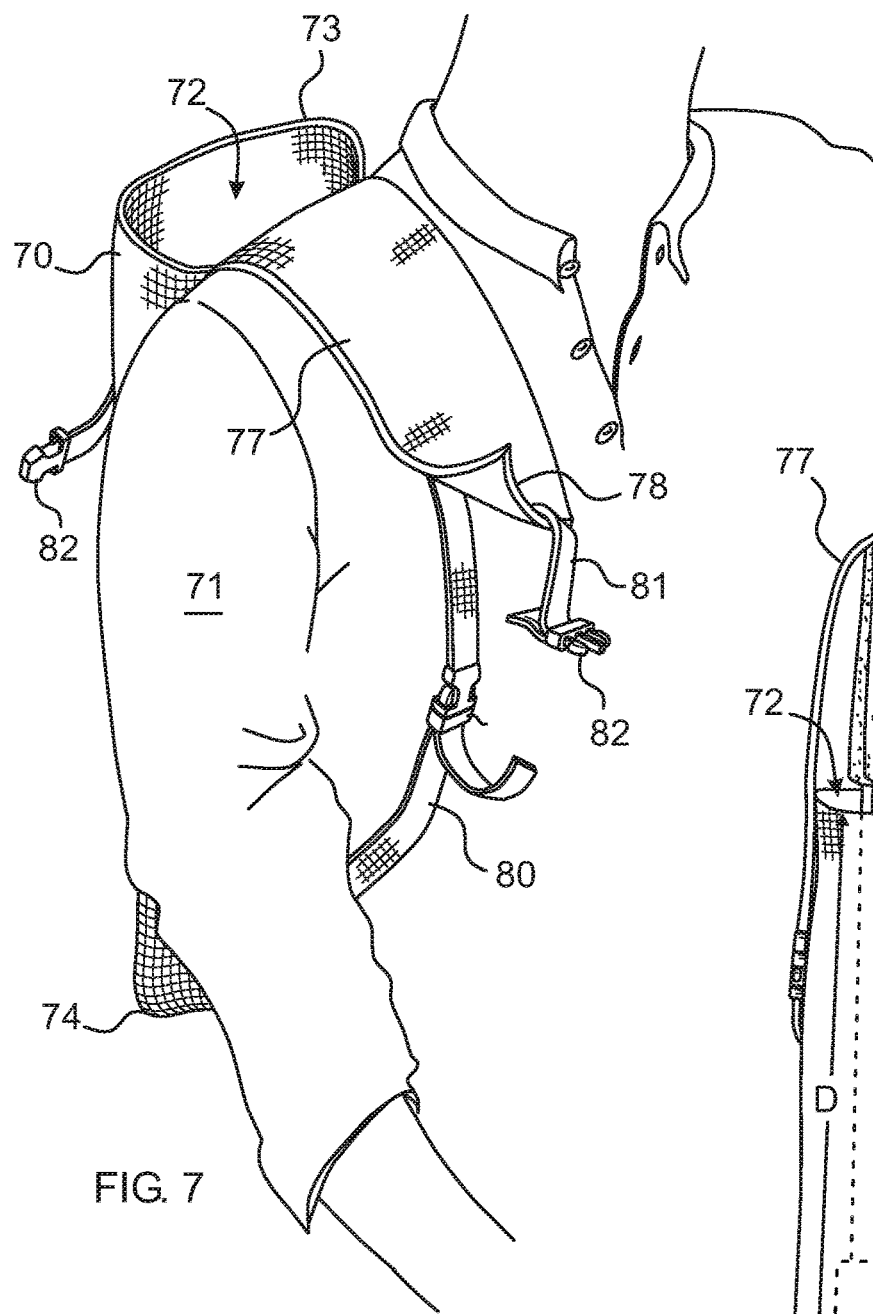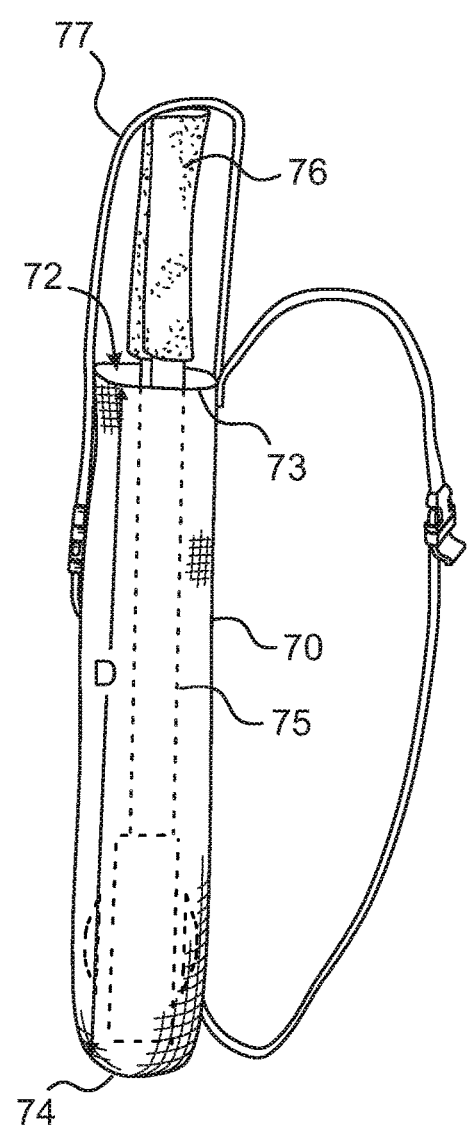

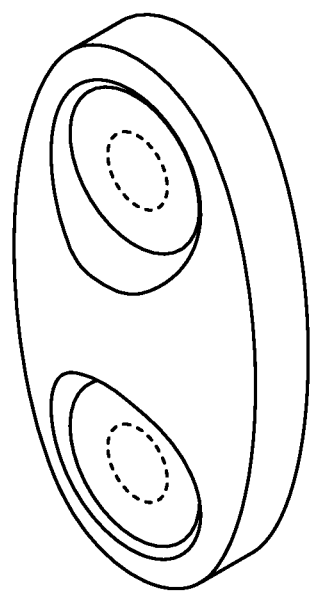
FIG. 15
FIG. 14
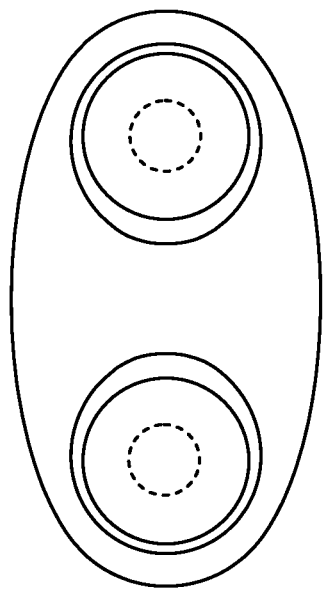
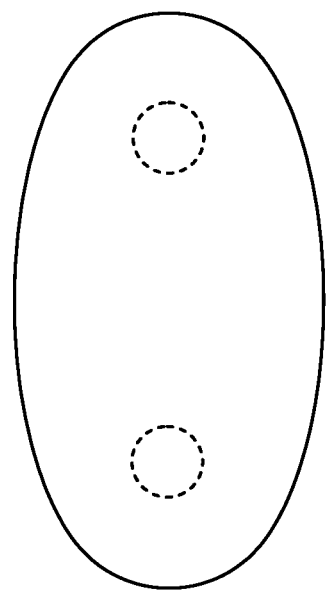
FIG. 16  FIG. 17  FIG. 18

FIBER-RESIN COMPOSITE BOLT CUTTER TOOL

PRIOR APPLICATION

This application is a continuation-in-part of U.S. patent application Ser. No. 29/562,350, filed 2016 Apr. 25, now U.S. Pat. No. D847598 issued 2019 May 7, which is a divisional of U.S. patent application Ser. No. 29/450,315, filed 2013 Mar. 15, now U.S. Pat. No. D754500 issued 2016 Apr. 26, which is a continuation-in-part of U.S. patent application Ser. No. 29/411,262, filed 2012 Jan. 18, now U.S. Pat. No. D684831 issued 2013 Jun. 25, which is a divisional of U.S. patent application Ser. No. 29/386,284, filed 2011 Feb. 27 now U.S. Pat. No. D668126 issued 2012 Oct. 2; which is a divisional of U.S. patent application Ser. No. 29/336,879 filed 2009 May 11 now U.S. Pat. No. D633764 issued 2011 Mar. 8, all of which are incorporated herein by reference.

FIELD OF THE INVENTION

This invention relates to hand tools and more particularly to bolt cutters.

BACKGROUND

Composite materials such as carbon fiber reinforced polymers have long been used to create structural elements due to their low weight and high stiffness/strength to bending moments along the oblong fibers' orientation.

Bolt cutters have become indispensable tools for emergency personnel such as police officers and firemen who need to gain immediate access through padlocked doorways or otherwise metal reinforced structural elements. Recent events such as the terrorist attacks of Sep. 11, 2001 make us keenly aware of the demanding physical environment placed on emergency responders. Firemen are often called upon to climb stairways in multi-story buildings carrying loads of heavy equipment where every ounce of added weight leads to operator fatigue and potential lowered effectiveness. Reducing the weight of that equipment can therefore lead directly to saving lives.

In many emergency situations it is often desirable to quickly extract a pair of bolt cutters from wherever they are carried, use them, and then quickly store the cutters for later use. Current means for carrying bolt cutters involve placing them in an all-purpose backpack along with other potentially obscuring items. This can make extraction and storage difficult and time consuming, and require help from other emergency team members, distracting them from other important tasks.

Bolt cutter tools typically provide a pair of jaws each carrying a blade that are opposingly mounted atop angularly reciprocating handles at the distal end or head as described in Juros, U.S. Pat. No. 5,081,769, incorporated herein by reference. It is not uncommon for the jaws of a bolt cutter to be designed to place a load on the cutting blade exceeding many pounds per square inch. Because of the large forces involved, the jaws in prior designs are typically made of thick plates of steel adding significantly to the weight of the tool. Prior art bolt cutters can weigh in excess of 6.5 pounds.

Composite materials such as carbon fiber-reinforced epoxy resins offer high strength and low weight. However, that strength is typically restricted to forces applied in a narrow range of directions. In other words, fiber-reinforced composite materials such as epoxy resin carbon fiber bundled composited are susceptible to damage from off-axis forces.

Another problem with many bolt cutters occurs when the jaws do not come together blade-to-blade, within the same plane. In such a situation the jaws will tend to scissor over the bolt hasp rather than pinch it. This causes even greater anti-planar distortions between the jaws.

Therefore, there is a need for an apparatus which addresses one or more of the above identified inadequacies.

SUMMARY

The principal and secondary objects of the invention are to provide an improved bolt cutter tool. These and other objects are achieved by combining light weight composite elements with metal elements in the various component structures of a bolt cutter tool.

In some embodiments there is provided an improved bolt cutter tool which comprises: a pair of opposing pivotally mounted jaws; wherein at least one of said jaws comprises a fiber-reinforced composite body secured to a blade comprising a hardened metal outer surface oriented to forcibly engage the other one of said jaws.

In some embodiments said tool further comprises: said blade being shaped and dimensioned to jacket said body.

In some embodiments said blade comprises: a cutting prow having a sharpened central edge; and, a pair of support members extending away from said sharpened central edge from lateral sides of said prow.

In some embodiments said blade comprises: a back panel connecting said support members; whereby said blade jackets said body.

In some embodiments said tool further comprises: a pair of hollow fiber resin composite handles.

In some embodiments said tool further comprises: an elastomeric damping plug inserted into a proximal opening of at least one of said handles.

In some embodiments said tool further comprises: a carry pouch having a guideway flap shaped and dimensioned to drape over a user's shoulder during use.

In some embodiments said tool further comprises: a pair of fiber-reinforced composite elliptical tie plates; and, wherein each of said jaws comprises a medial section pivotably mounted by one of a pair of axle bolts to said tie plates.

In some embodiments said pair of fiber-reinforced composite elliptical tie plates comprises: a rounded sidewall; a convex top surface; and, a pair bolt-bearing wells inset into said top surface.

The content of the original claims is incorporated herein by reference as summarizing features in one or more exemplary embodiments.

BRIEF DESCRIPTION OF THE DRAWINGS

FIG. 4 is a diagrammatical partial cross sectional side view of a handle of tool of FIG. 1.

FIG. 5 is a diagrammatical perspective illustration of the I-beam style jaws of a bolt cutter tool according to an alternate exemplary embodiment of the invention.

FIG. 6 is a diagrammatical partial cross-section side view of the I-beam style jaw of FIG. 5 taken along line B-B'.

FIG. 7 is a diagrammatical perspective illustration of bolt cutter tool carry pouch secured to the should of a user.

FIG. 8 is a diagrammatical side view of the pouch of FIG. 7 holding a bolt cutter tool.

FIG. 14 is a top, front, left side perspective view of a design an elliptical carbon fiber strapping member or tie plate for a bolt cutter tool.

FIG. 15 is a top plan view thereof, the bottom plan view being a mirror image thereof.

FIG. 16 is a front elevation view thereof.

FIG. 17 is a back elevation view thereof.

FIG. 18 is a right side elevation view thereof, the left side elevation view being a mirror image thereof.

DESCRIPTION OF THE EXEMPLARY EMBODIMENTS

Figure 1:
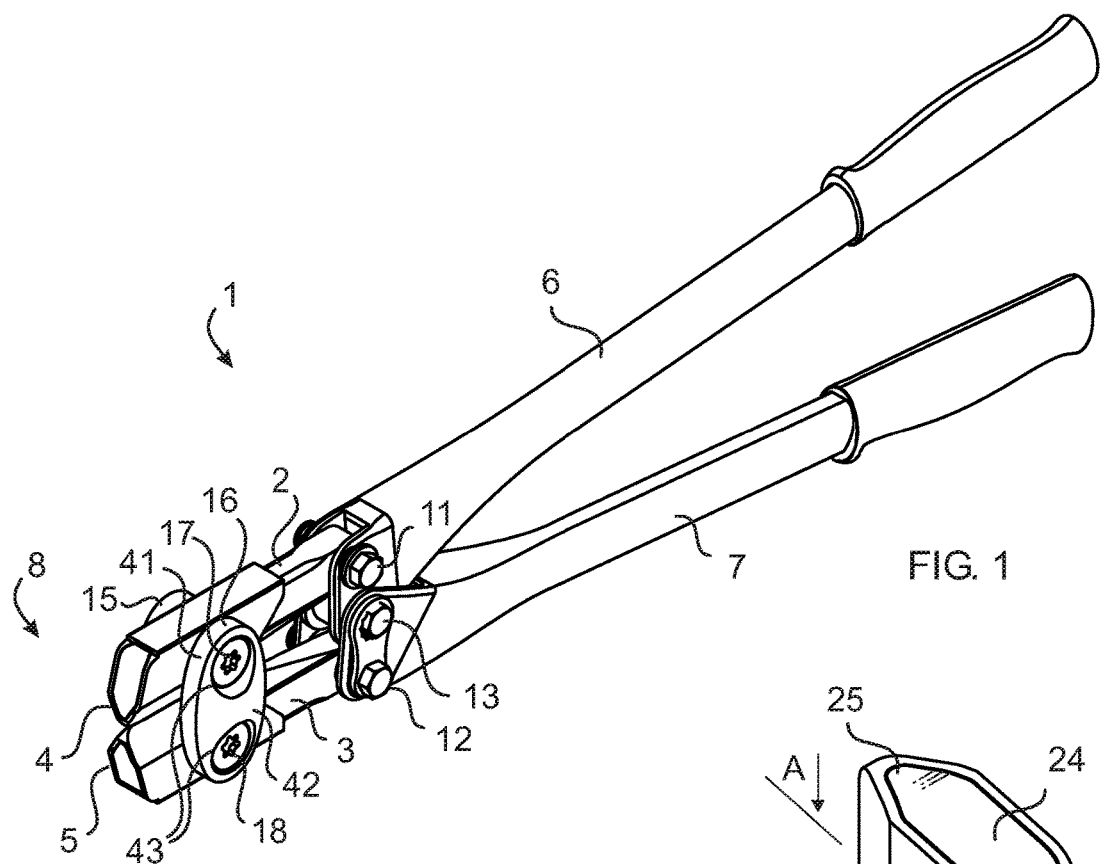
FIG. 1 is a diagrammatical perspective illustration of a bolt cutter tool according to an exemplary embodiment of the invention.

Referring now to the drawing, there is illustrated in FIGS. 1-4 a bolt cutter tool 1 having a pair of opposing, pinching jaws 2,3, each carrying a blade 4,5 opposingly mounted at the distal end of angularly reciprocating handles 6,7 to form the head 8 which operates similarly to the tool shown in Juros, U.S. Pat. No. 5,081,769, incorporated herein by reference.

One jaw 2 is pivotably mounted at is proximal end to the distal end of the first handle 6 using a first axle bolt 11, while the other jaw 3 is pivotably mounted at is proximal end to the distal end of the second handle 7 using a second axle bolt 12. The handles are separately pivotably mounted to one another at their distal ends using a third axle bolt 13. The rotation axis of all three bolts is substantially parallel and perpendicular to the plane of pinching motion of the jaws. The third axle bolt 13 is located between the other two axle bolts and has a tramming adjustment of the jaws to one another so that the cutting prows of the blades meet squarely against one another.

Each jaw is further pivotably mounted in a medial section to a pair of straddling elliptical carbon fiber strapping members or tie plates 15,16 by a pair of dedicated axle bolts 17,18. Each tie plate has rounded side surfaces 41, a convex top surface 42, and inset bolt-bearing wells 43 to avoid snags while providing the necessary strength to carry the loads of the pinching jaws.

Each jaw 2,3 includes an oblong body 20 made from a strong, light-weight fiber-resin composite and carries a metal cutting blade. The jaw and blade are shaped and dimensioned to simultaneously provide an aesthetically pleasing appearance and enhanced utility as described below.

The body can be movably secured to the distal end of a bolt cutter tool. The jaw is substantially symmetrical about a plane extending front to back and top to bottom. This is typically the plane of motion of the bolt cutter handles. The jaw body comprises a pair of planar and substantially parallel and opposite vertical lateral panels 21,22. A vertical rear wall 23 orthogonally joins the panels along back surface of the jaw. The rear wall transitions arcuately to a curved top wall 24 and to a substantially semi-cylindrical bottom wall. The bottom wall curves cylindrically toward the front of the jaw. The lower portion of the front wall extends upwardly and forwardly from the bottom along a substantially planar, wedge-shaped face intersecting with a tongue structure 25 for interfacing with a corresponding groove structure on the blade described below. Transverse holes 26,27 extend orthogonally and transversely through the body from lateral panel to opposite lateral panel to accommodate bolts for straps or other lever forming structures.

The jaw is made from a unitary piece of carbon fiber-epoxy resin composite laminate material. Although this material exhibits great tensile strength and a high strength-to-weight ratio, it can have limited compressive strength. Devices made from fiber-resin laminate composites can be sensitive to excessive localized mechanical forces which can result in fraying, delaminating, cracking or other damage which can render the device inoperative. Therefore, great care has been taken to accommodate and distribute anticipated compressive forces.

The fibers are preferably formed into substantially planar thermosetting preimpregnated resin tape or sheets known as "prepreg" such as unidirectional fiber tape available from American Cyanamid Co. Of Wayne, N.J. The sheets are then stacked lamellarly having the plane of the sheets be parallel with the top to bottom and front to back plane. The fibers therefore primarily stay within the plane run longitudinally top to bottom, and front to back so that they carry and distribute the loads along the length and front to back width of the jaw. In this way, no one portion of the jaw is subjected to loads and stresses which would likely cause separation and fraying.

The jacketing blade 4 has a major dimension extending bottom to top. The blade has a pointed prow having a longitudinal apical ridge or central edge 30 extending along its front surface acting as the cutting surface. The prow flares rearwardly and integrally transitions to a pair of support members 32,33 astride said body. The rear edges of the support members transition and are tied to one another by a back panel 34. The back panel can be thickened steel to act as a hammer surface while protecting the underlying composite body. The outer surface can be textured 35 to further its use as a hammer.

The back side of the ridge of the blade and running substantially parallel to it, is an oblong groove 31 running longitudinally along the back side which forms the mounting interface between the blade and the jaw. Thus, the groove is shaped and dimensioned to intimately and snuggly nest with a substantially correspondingly shaped tongue formed along the central front surface of the jaw. The blade is made from hardened steel, tungsten carbide, crucible steel, or other strong and hard material suitable for cutting steel bolts.

The interfacing surfaces between the composite body and the metal blade structure are shaped and dimensioned to contact one another along gradually transitioning surfaces in order to avoid localized stresses. In other words, the internal surfaces of the blade structure and the external surfaces of the body have flat surfaces which transition along mutually nesting curved surfaces. Thus the internal surfaces of the blade are commensurate with the external surfaces of the body where the two contact one another.

At the front of the blade there is a transverse semi-cylindrical notch 40 located at the bottom end of the ridge. This notch faces a corresponding notch with an opposing blade on a tool head. The face-to-face notches can bear against a cylindrical pivot post and even carry a wobble inhibiting spring as described in Juros supra. By providing a bearing in the hard metal blade structure rather than the composite material jaw, high compression forces can be distributed before reaching the composite material jaw.

The groove and tongue have a cross sectional shape which allows the compressive forces on the blade to be distributed at the interface to the jaw in a manner that minimizes or even eliminates inter-laminar shear and converts the force reaction to laminar compression. The interface is generally U-shaped, but with important specifics.

Figure 2:
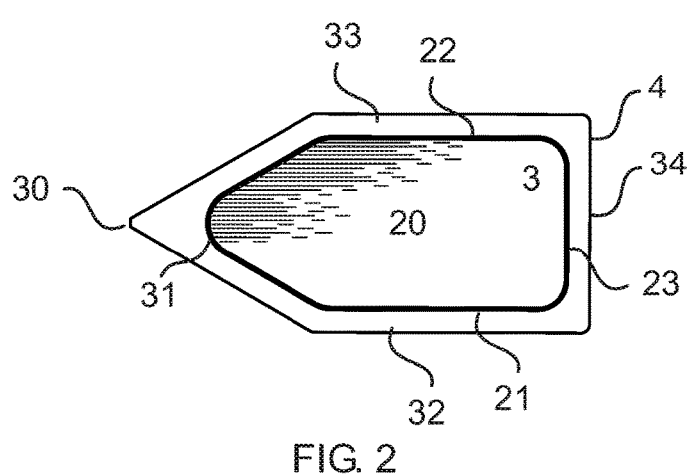
FIG. 2 is a diagrammatical perspective illustration of a combined bolt cutter jaw and blade portion of the tool of FIG. 1.
Figure 3:
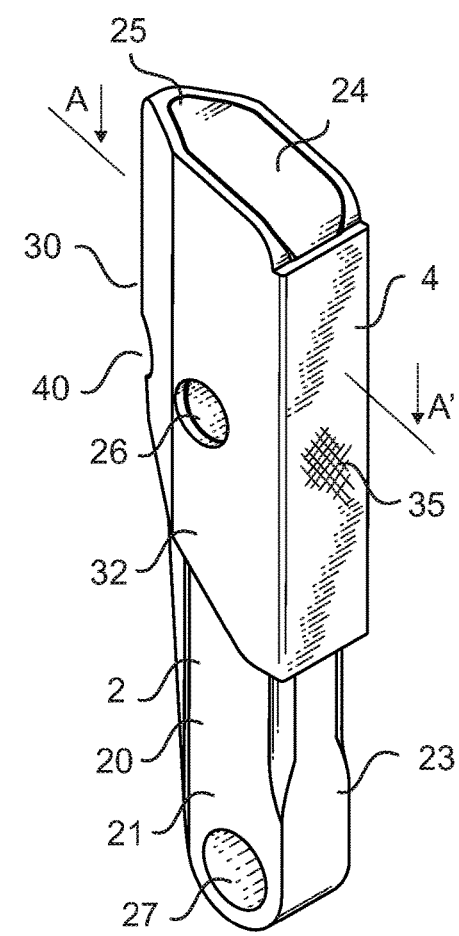
FIG. 3 is a diagrammatical partial cross-section top view of the jaw and blade of FIG. 2 taken along line A-A'.
Figure 9:
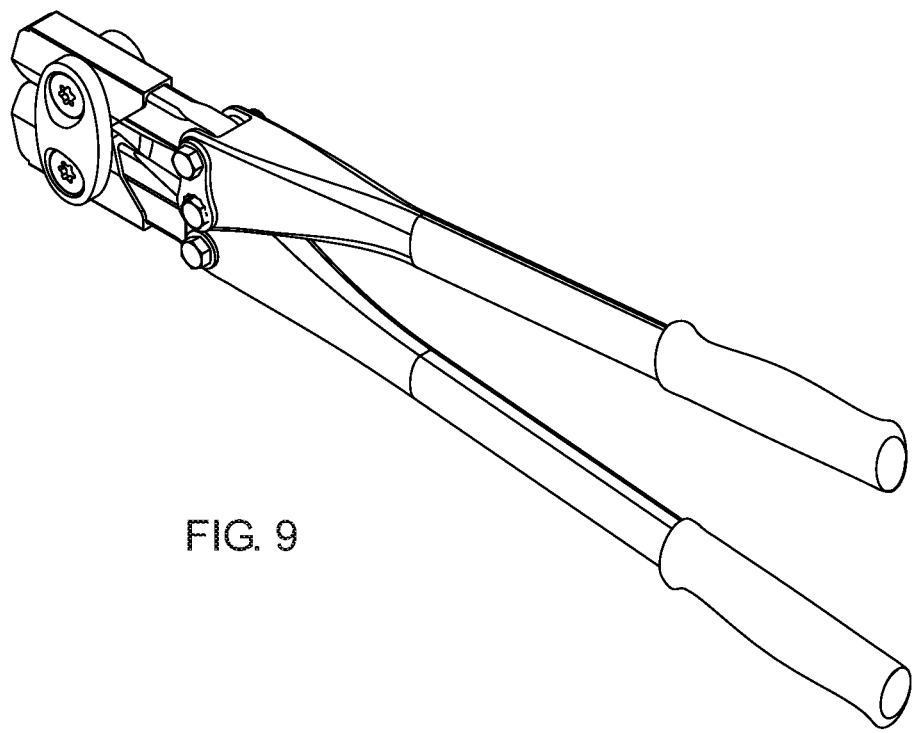
FIG. 9 is a top, back, left side perspective view of a design for a combined steel and fiber-resin composite bolt cutter.
Figure 10:
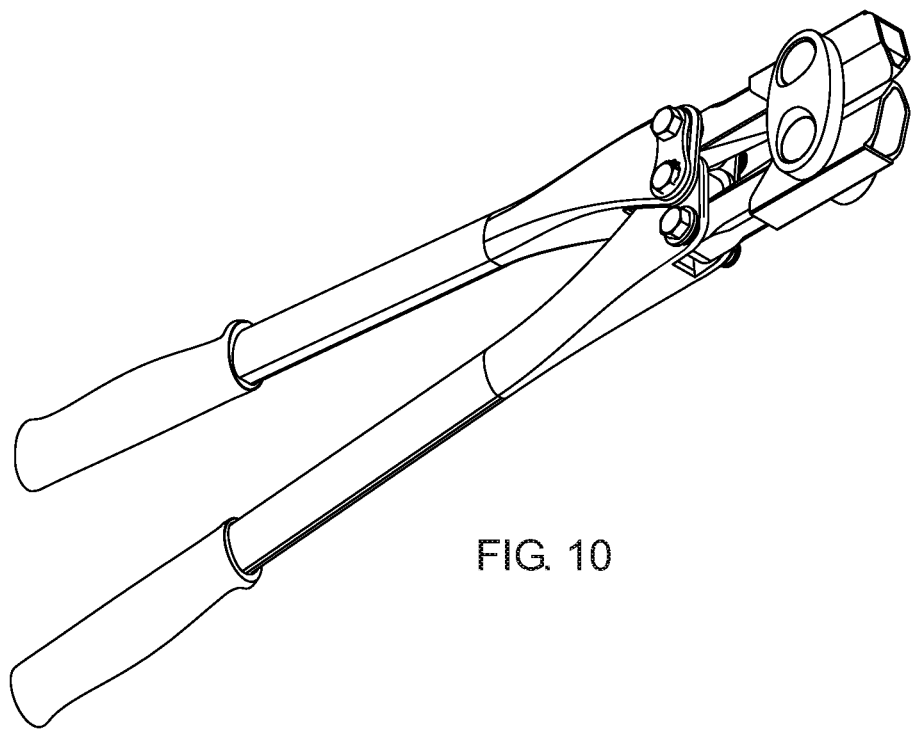
FIG. 10 is a bottom, front, right side perspective view thereof.
Figure 11:
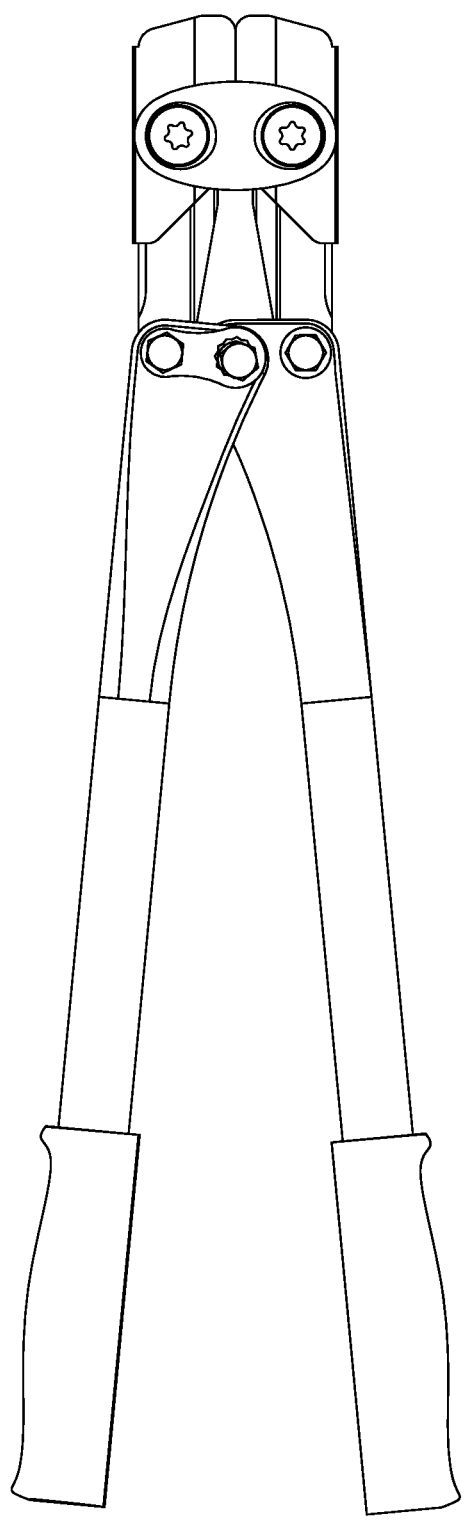
FIG. 11 is a right side plan view thereof.
Figure 12:
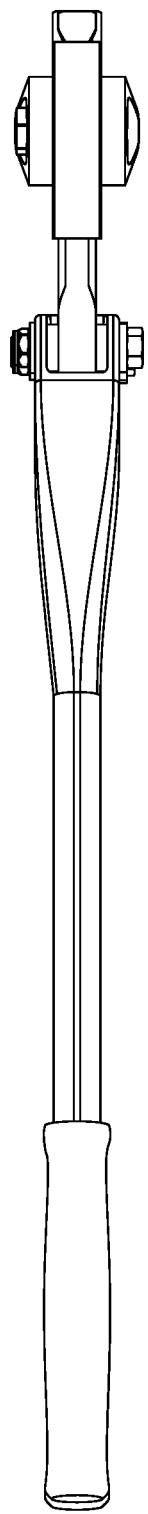
FIG. 12 is a top plan view thereof.
Figure 13:
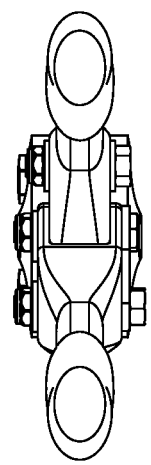
FIG. 13 is a back plan view thereof.

As shown FIG. 2, there is a top view of the jaw 3 which clearly shows the cross-sectional shape of the jaw/blade interface. In this view the shading lines are drawn in the same orientation as the laminated sheets. The tip of the cross-section, corresponding to the apex of the tongue, and the base of the "U" is rounded and extends laterally and rearwardly at an oblique angle to form the to arms of the "U" in a diverging rounded "V" shaped orientation. Each of the rearwardly extending arms of the "V" has a rounded transition to the parallel lateral support members. Specifically, from the rounded apex of the tip, the arm extends substantially linearly at an angle of about 45 degrees to the centerline.

During cutting, force is applied to the blade front ridge, from the right in FIG. 2. Because of the wedge or funneling shape of the interface, the arms of the rounded "V" will squeeze the laminate sheets together under compression rather than to induce inter-laminar shear forces.

The fiber strands are bound together in a binding matrix material such as epoxy. The material is selected to be thermosetting such that the resin cures more rapidly when subjected to a selected elevated temperature. The material such as epoxy is also selected so that when combined with a fiber material such as carbon fiber, it can be cured and formed in a heated mold, thus applying the above selected elevated temperature while simultaneously applying pressure through a preformed mold. The blade can be fastened to the jaw using a separate adhesive or can be adhered during the thermosetting molding process used to cure the jaw, using the adhesiveness of the epoxy resin for example in fiber-resin composite material.

The surfaces of the groove can be further shaped and dimensioned to accommodate a greater amount of adhesive. Further, these surfaces can be knurled or otherwise treated to form a greater tooth for the bonding of the epoxy.

As shown in FIG. 4, the substantially hollow handles 6,7 are sealed from debris entering the centeral lumen 51 by an anterior plug 52 made of elastomeric material. The plug is further shaped and dimensioned to have an axial length greater than its width so that it can provide more material and act to dampen shocks applied to the handle, thus avoiding fatigue of the composite material. Each of the handles has a durable outer surface coating 53 made from polyurethane or other durable material. In this way, heavy metal parts can be replaced partially or entirely with lighter weight composite or metal-and-composite parts while maintaining low bulk and superior performance. The coating provides necessary protection to the composite handles against scuffs or other off-axis forces impinging on the sides of the handle.

In order to provide enough protection while maintaining low weight the mean thickness of the protective coating should be between about 0.5 to 1.0 times the thickness of the side wall of the composite handle member. In the case of a common bolt cutter tool having a composite handle wall thickness of between about 3.0 and 7.0 millimeter, the mean thickness of the protective coating can be between about 1.5 and 7.0 mm, and more preferably between about 2.0 and 4.0 mm.

The hand grips can be molded separately from a durable, resiliently flexible material and pressed onto the posterior ends of each handle. Preferably the grips can be molded using a high friction material, commercially available from the 3M Corporation of Minnesota.

Referring now to FIGS. 5-6, there is shown an alternate embodiment of a bolt cutter tool 61 having a pair of opposing, pinching jaws 61,62 made from steel or other hard, strong, durable material. Structurally, the jaws can be similar to the jaws of the embodiment of FIG. 1. However, an important difference is that a first one 61 of the pair of jaws can include a pair of indentations 63,64 which can be symmetric about a vertical plane 65 bisecting the jaw. In this way the cross-section of the jaw can take on an I-beam-type shape as shown in FIG. 6. The second jaw 62 can have similar indentations. In this way the jaws can exhibit superior strength and hardness while reducing the amount of material forming the jaws, and thus reducing weight in that part of the bolt cutter tool.

Referring now to FIGS. 7-8, there is shown a quick deploy and quick stow bolt cutter carry pouch 70 to be worn over the shoulder of a user 71. The pouch includes a pocket 72 having a top opening 73 and a closed bottom 74. The pocket is shaped to securely and releasably hold a single pair of bolt cutters 75 in the handle-up orientation. The distance D from the top opening to the closed bottom is selected to ensure that the grip portion 76 of the cutters extends upwardly beyond the opening so as to be easily grasped by the user by feel alone.

A flexible flap 77 attaches at a first end to the edge of the top opening closest to the body of the user and has a length which allows it to rest over the user's shoulder having its free end 78 toward the front. This allows the flap to act as a feel alone guideway for the user to reinsert the cutters when they need to be stowed. An adjustable strap 80 secures the pouch to the user. A belt 81 having an end clasp 82 secures the free end of the flap to the far side of the pouch away from the user to secure the cutters within the pouch pocket.

FIGS. 9-13 show the ornamental design of a bolt cutter tool.

FIGS. 14-18 show the ornamental design of an elliptical carbon fiber strapping member or tie plate for a bolt cutter tool.

While the preferred embodiments of the invention have been described, modifications can be made and other embodiments may be devised without departing from the spirit of the invention and the scope of the appended claims.

What is claimed is:

1. A bolt cutter tool comprises:
a pair of opposing pivotally mounted jaws;
wherein at least one of said jaws comprises a fiber-reinforced composite body secured to a blade comprising a hardened metal outer surface oriented to forcibly engage the other one of said jaws;
said blade being shaped and dimensioned to jacket said body.

2. The tool of claim 1, wherein said blade comprises:
a cutting prow having a sharpened central edge; and,
a pair of support members extending away from said sharpened central edge from lateral sides of said prow.

3. The tool of claim 2, wherein said blade comprises:
a back panel connecting said support members;
whereby said blade jackets said body.

4. The tool of claim 1, which further comprises:
a pair of hollow fiber resin composite handles.

5. The tool of claim 4, which further comprises:
an elastomeric damping plug inserted into a proximal opening of at least one of said handles.

6. The tool of claim 1, which further comprises:
a carry pouch having a guideway flap shaped and dimensioned to drape over a user's shoulder during use.

7. A bolt cutter tool comprises:
a pair of opposing pivotally mounted jaws;
wherein at least one of said jaws comprises a fiber-reinforced composite body secured to a blade comprising a hardened metal outer surface oriented to forcibly engage the other one of said jaws;
a pair of fiber-reinforced composite elliptical tie plates; and,
wherein each of said jaws comprises a medial section pivotably mounted by one of a pair of axle bolts to said tie plates.

8. The tool of claim 7, wherein each of said pair of fiber-reinforced composite elliptical tie plates comprises:
a rounded sidewall;
a convex top surface; and,
a pair bolt-bearing wells inset into said top surface.

\* \* \* \* \*